US008792397B2

(12) United States Patent
Kutch

(10) Patent No.: US 8,792,397 B2
(45) Date of Patent: Jul. 29, 2014

(54) AUTOMATED DISCOVERY OF COMMUNICATION PORTS COUPLED TO A SWITCH

(75) Inventor: Patrick G. Kutch, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 302 days.

(21) Appl. No.: 13/426,999

(22) Filed: Mar. 22, 2012

(65) Prior Publication Data

US 2013/0250964 A1 Sep. 26, 2013

(51) Int. Cl.
*H04L 5/22* (2006.01)
(52) U.S. Cl.
USPC .......... 370/299; 370/285; 370/396; 370/401; 370/421
(58) Field of Classification Search
USPC ............ 370/285, 299, 396, 401, 421, 419, 370/395.3
See application file for complete search history.

(56) References Cited

U.S. PATENT DOCUMENTS

| | | | | |
|---|---|---|---|---|
| 7,516,211 B1* | 4/2009 | Gourlay et al. | ............... | 709/224 |
| 7,689,736 B2* | 3/2010 | Kalwitz | ........................... | 710/31 |
| 8,472,336 B2* | 6/2013 | Fukuyama et al. | ........... | 370/252 |
| 8,472,443 B2* | 6/2013 | Enduri et al. | ................. | 370/392 |
| 2006/0220533 A1* | 10/2006 | Achiwa et al. | ................ | 313/504 |
| 2008/0016436 A1* | 1/2008 | Liu et al. | ....................... | 715/212 |

* cited by examiner

*Primary Examiner* — Ricky Ngo
*Assistant Examiner* — Dewanda Samuel
(74) *Attorney, Agent, or Firm* — Kacvinsky Daisak Bluni PLLC

(57) ABSTRACT

Examples are disclosed for exchanging messages between a switch and network devices having input/output devices. In some examples, the input/output devices for network devices may support communication ports capable of being coupled or connected to the switch via physical communication links. For these examples, the exchanged messages may include information associated with the communication ports or the input/out devices. Other examples are described and claimed.

21 Claims, 9 Drawing Sheets

Allocation Table 600

| Network Device | Allocated Unique Identifiers |
|---|---|
| 120-1 | 120-1A |
| | 120-1B |
| | 120-1C |
| | 120-1D |
| | 120-1E |
| | 120-1F |
| | 120-1G |
| | 120-1H |
| | 120-1I |
| 120-2 | 120-2A |
| | 120-2B |
| | 120-2C |
| | 120-2D |
| | 120-2E |
| | 120-2F |
| | 120-2G |
| | 120-2H |
| | 120-2I |
| 120-n | 120-nA |
| | 120-nB |
| | 120-nC |
| | 120-nD |
| | 120-nE |
| | 120-nF |
| | 120-nG |
| | 120-nH |
| | 120-nI |

FIG. 6

Interconnect Response Message Format
700

| Unique Identifier | I/O Device # | Port # |
|---|---|---|
| 710 | 720 | 730 |

FIG. 7

Interconnection Map 800

| Network Device | Unique Identifier | I/O Device # | Port # | Switch Port # |
|---|---|---|---|---|
| 120-1 | 120-1A | 1 | 1 | 114-1 |
|  | 120-1E | 2 | 2 | 114-2 |
|  | 120-1H | n | 2 | 114-3 |
| 120-2 | 120-2A | 1 | 1 | 114-4 |
|  | 120-2D | 2 | 2 | 114-5 |
|  | 120-2H | n | 2 | 114-6 |
| 120-n | 120-nA | 1 | 1 | 114-7 |
|  | 120-nE | 2 | 2 | 114-8 |
|  | 120-nF | n | 1 | 114-9 |

FIG. 8

AUTOMATED DISCOVERY OF COMMUNICATION PORTS COUPLED TO A SWITCH

BACKGROUND

One or more input/output (I/O) devices may be included on a computing platform or network device deployed in a server environment. In some examples, the one or more I/O devices may function as network interface cards that support a multitude of communication ports to receive and transmit data from the network device. Sometimes the network device may be among several other network devices included in a server rack. The server rack may also include at least one switch to interconnect the network devices in the server rack and/or couple the network devices to a network remote to the server rack. Typically, the network devices may couple to the switch via physical communication links such as Category 5e cable and/or optical fiber cable. These physical communication links may run between communication ports on the switch to communication ports supported by the I/O devices included on the network devices.

BRIEF DESCRIPTION OF THE DRAWINGS

FIG. 6 illustrates an example allocation table.

FIG. 7 illustrates an example interconnect response message format.

FIG. 8 illustrates an example interconnection map.

DETAILED DESCRIPTION

As contemplated in the present disclosure, physical communication links may run between communication ports on a switch to communication ports supported by the I/O devices included on network devices. In some examples, the number of I/O device supported communication ports on a given network device may be as high as ten. Traditionally, technicians performing the manual task of physically connecting each of the physical communication links need to take careful note of which physical communication link runs between a switch communication port and a network device communication port. So physically connecting the communication links of a rack server having several network devices that each have I/O devices capable of supporting several communication ports may be a time consuming, manual operation. Also, if one or more of the network devices are replaced, the physical communication links may need to be placed in a similar port to port configuration in order to maintain system-wide configurations associated with redundancies, fail-overs, load balancing or quality of service (QoS).

In some examples, techniques are implemented at a switch coupled to one or more network devices via physical communication links. For these examples, an enumeration request message to a first I/O device for a network device may be sent by the switch. The enumeration request message may include a request for a count of communication ports supported by I/O devices maintained at the network device. An enumeration response message may be received from the first I/O device that includes the count. Unique identifiers may then be allocated based on the count included in the enumeration response message.

According to some examples, a request message such as an interconnected request message may then be sent by the switch to the first I/O device. The interconnect request message may include the allocated unique identifiers and may also include a request for forwarding a response message such as an interconnect response message from each communication port coupled to the switch via separate physical communication links. Interconnect response messages forwarded from each communication port coupled to the switch via the separate physical communication links may then be received. In some examples, each interconnect response message may include a unique identifier from among the allocated unique identifiers and information associated with an I/O device supporting the communication port via which the respective interconnect response message was forwarded. A map such as an interconnection map may then be generated by the switch based on the received interconnect response messages.

Figure 1:
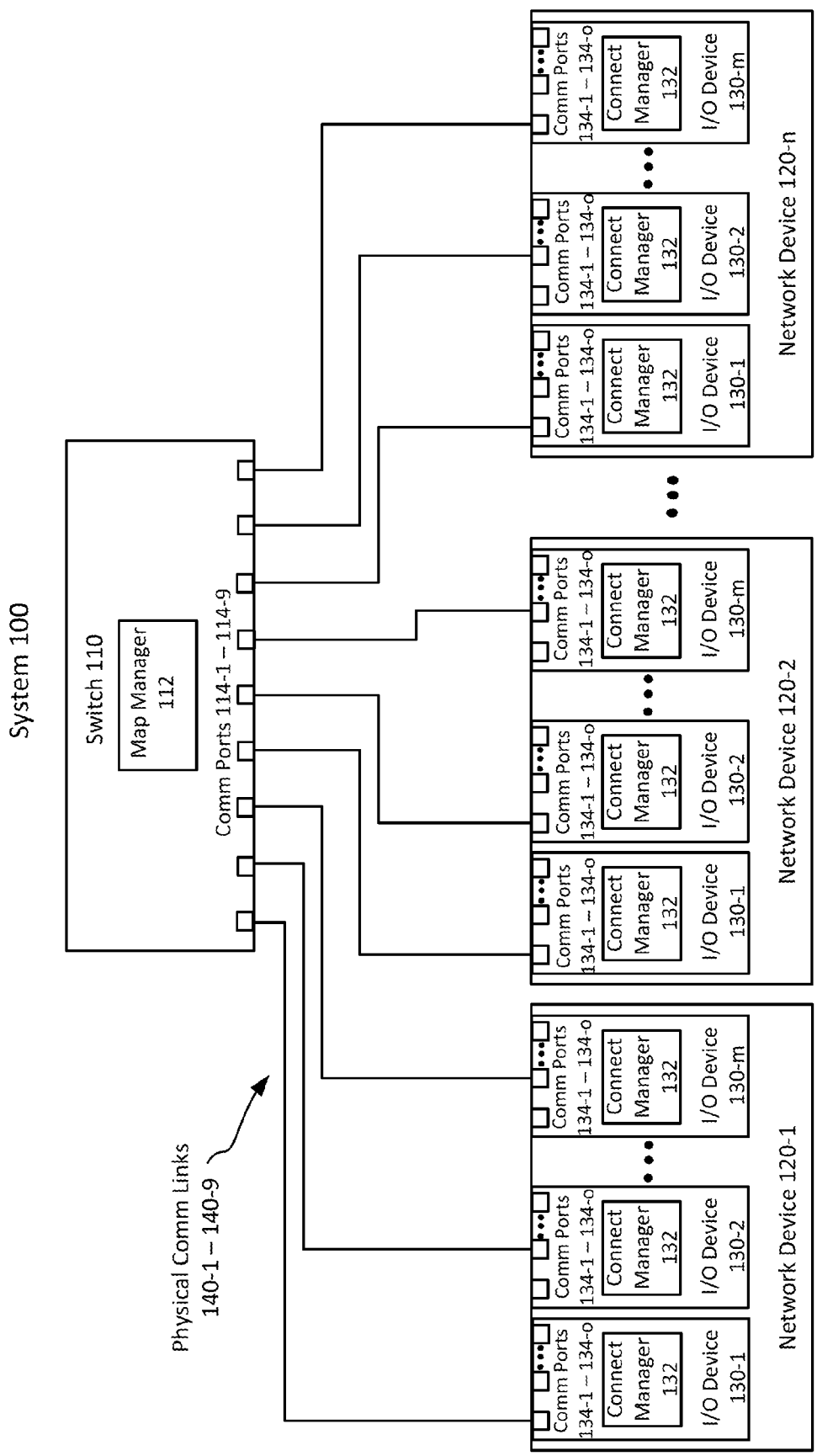
FIG. 1 illustrates an example system.

FIG. 1 illustrates an example system 100. In some examples, as shown in FIG. 1, system 100 may include a switch 110 and network devices 120-1 to 120-*n* (where "n" represents any whole integer>2). Also, as shown in FIG. 1, switch 110 may be coupled to network devices 120-1 to 120-*n* via physical communication links 140-1 to 140-9. As shown in FIG. 1, I/O devices 130-1 to 130-*m* (where "m" represents any whole integer>2) on each network device may include communication ports 134-1 to 134-*o* (where "o" represents any whole integer>2). According to some examples, as shown in FIG. 1, physical communication links 140-1 to 140-9 may separately couple switch 110's communication ports 114-1 to 114-9 to communication ports 134-1 to 134-*o* for network devices 120-1 to 120-*n*. Although nine switch communication ports 114-1 to 114-9 and nine physical communication links 140-1 to 140-9 are shown in FIG. 1, this disclosure is not limited to systems with only nine communication ports at a switch or physical communication links. This disclosure contemplates switches having any number of communication ports and coupling to network devices via any number of physical communication links.

In some examples, as shown in FIG. 1, switch 110 includes a map manager 112 and each I/O device at network devices 120-1 to 120-*n* includes a connect manager 132. As described more below, map manager 112 and connect manager 132 may include logic and/or features configured to exchange messages. The messages may be exchanged in order to automate discovery of network device communication ports (e.g., communication ports 134-1 to 134-*o*) coupled to switch communication ports (e.g., communication ports 114-1 to 144-9) via physical communication links (e.g. physical communication links 140-1 to 140-9). The automated discovery process may include the generation of an interconnection map by logic and/or features of map manager 112.

In some examples, physical communication links 140-1 to 140-9 may include various types of wired or optical communication mediums such as Category 5e cable, optical fiber cable or patch cable. For these examples, physical communication links 140-1 to 140-9, I/O devices 130-1 to 130-*m* and switch 110 may be operated in accordance with one or more applicable communication or networking standards in any version. According to some examples, the networking standards may include standards (including progenies and variants) such as the various Ethernet standards promulgated by the Institute of Electrical and Electronics Engineers (IEEE). The Ethernet standards may include IEEE 802.3-2008, Carrier sense Multiple access with Collision Detection (CSMA/CD) Access Method and Physical Layer Specifications, Published in December 2008 (hereinafter "the Ethernet standard").

Figure 2:
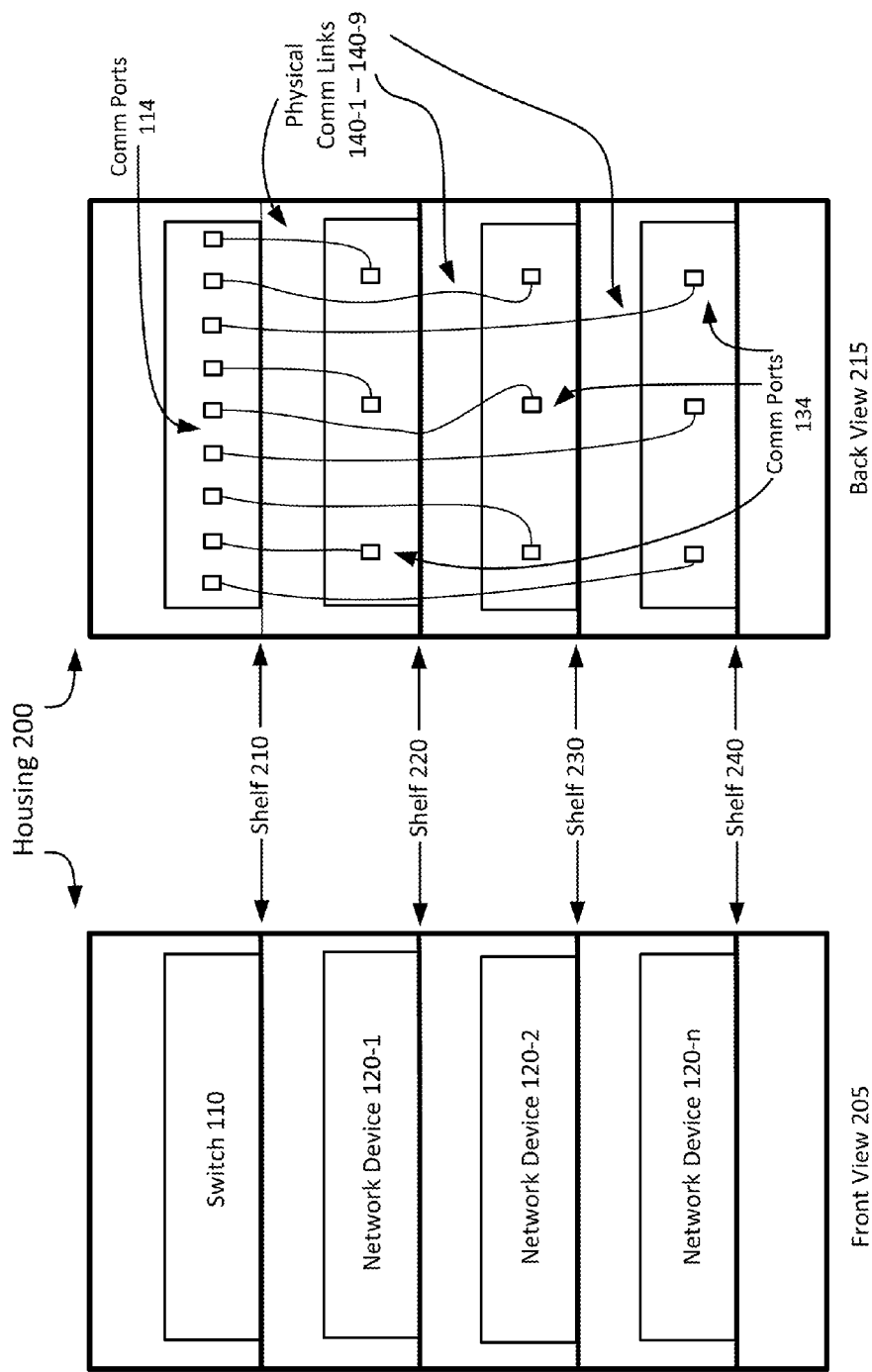
FIG. 2 illustrates front and back views of a housing that includes a switch and network devices.

FIG. 2 illustrates front and back views of a housing that includes a switch and network devices. As shown in FIG. 2, housing 200 includes elements of system 100 such as switch 110 and network devices 120-1 to 120-n. Housing 200 is also shown in FIG. 2 as including shelves 210 to 240 to respectively hold switch 110 and network devices 120-1 to 120-n. According to some examples, front view 205 may be a view of the front of housing 200 and back view 215 may be a view the back of housing 200. Back view 215 shows physical communication links 140-1 to 140-9 coupling communication ports 114 to communication ports 134. While a limited number, type and arrangement of components are shown in FIG. 2 for purposes of illustration, it should be understood that the embodiments are not limited in this respect.

According to some examples, housing 200 may be configured to include several more network devices each having a number of communication ports. Also, switch 110 may be configured to support a higher number of communication ports for these additional network devices. Additional physical communication links may also be added to interconnect the switch communication ports with the additional communication ports. As a result of these additional physical communication links, an automated discovery process may allow the elements of system 100 plus any additional network devices to be interconnected in a more efficient manner.

Figure 3:
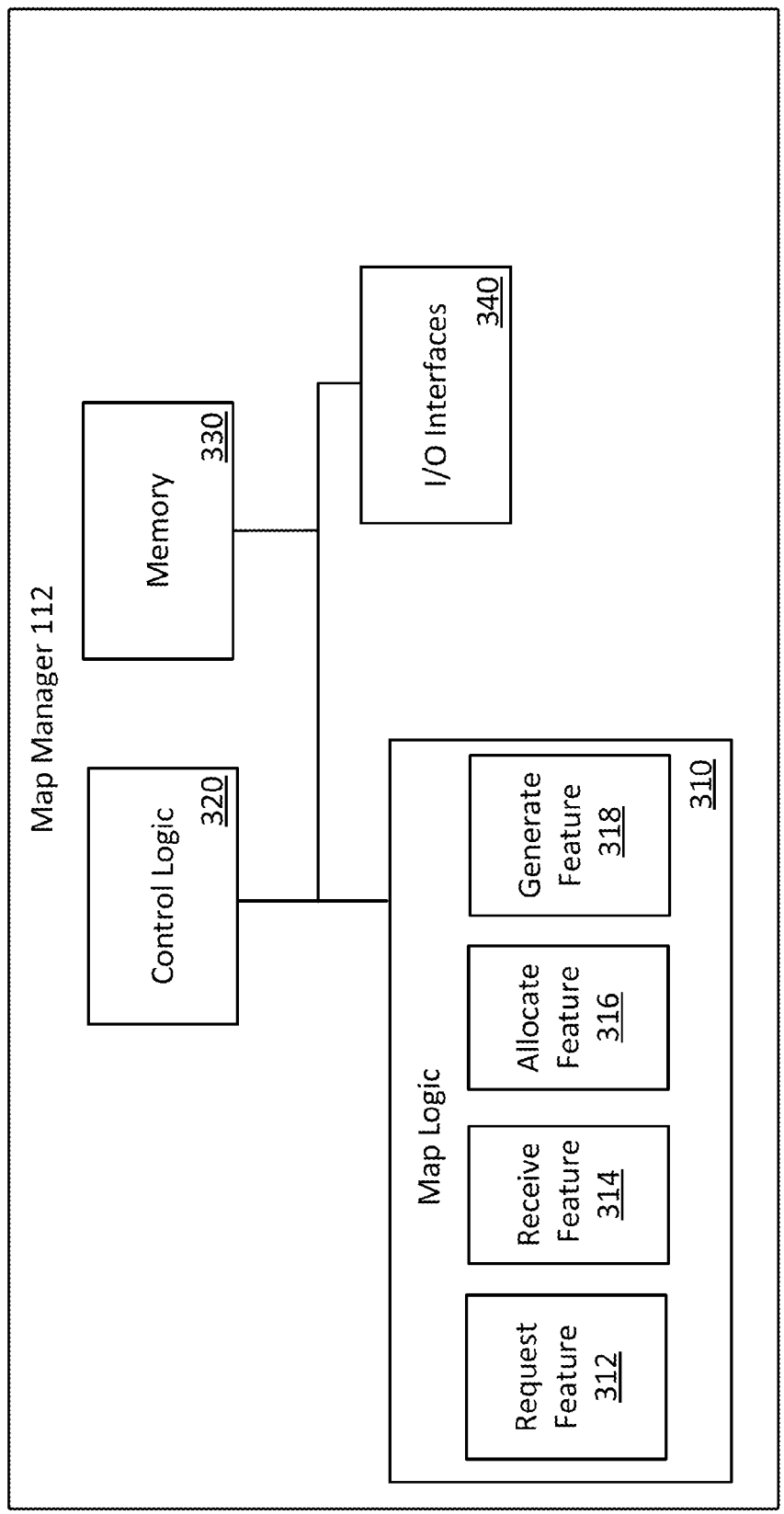
FIG. 3 illustrates a block diagram of an example architecture for a map manager.

FIG. 3 illustrates a block diagram of an example architecture for map manager 112. In some examples, map manager 112 includes features and/or logic configured or arranged for exchanging messages with connection managers 132 at I/O devices in order to automate discovery of network device communication ports. According to some examples, as shown in FIG. 3, map manager 112 includes a map logic 310, a control logic 320, a memory 330 and input/output (I/O) interfaces 340. As illustrated in FIG. 3, map logic 310 may be coupled to control logic 320, memory 330 and I/O interfaces 340. Map logic 310 may include one or more of a request feature 312, a receive feature 314, an allocate feature 316 or a generate feature 318, or any reasonable combination thereof.

In some examples, the elements portrayed in FIG. 3 are configured to support or enable map manager 112 as described in this disclosure. A given map manager 112 may include some, all or more elements than those depicted in FIG. 3. For example, map logic 310 and control logic 320 may separately or collectively represent a wide variety of logic device(s) or executable content to implement the features of map manager 112. Example logic devices may include one or more of a microprocessor, a microcontroller, a processor circuit, a field programmable gate array (FPGA), an application specific integrated circuit (ASIC), a sequestered thread or a core of a multi-core/multi-threaded microprocessor, or a combination thereof.

In some examples, as shown in FIG. 3, map logic 310 includes request feature 312, receive feature 314, allocate feature 316 or generate feature 318. Map logic 310 may be configured to use one or more of these features to perform operations. For example, request feature 312 may send enumeration request messages or interconnection request messages to one or more connect managers at I/O devices located at network devices. Receive feature 314 may receive responses from the connect managers and/or communication ports at the network devices. Allocate feature 316 may allocate unique identifiers based on counts of communication ports supported by I/O devices located at the network devices. Generate feature 318 may generate an interconnection map based on reply messages that were forwarded from communication ports at the network devices that are coupled to switch 110.

In some examples, control logic 320 may be configured to control the overall operation of map manager 112. As mentioned above, control logic 320 may represent any of a wide variety of logic device(s) or executable content. For some examples, control logic 320 may be configured to operate in conjunction with executable content or instructions to implement the control of map manager 112. In some alternate examples, the features and functionality of control logic 320 may be implemented within map logic 310.

According to some examples, memory 330 may be arranged to store executable content or instructions for use by control logic 320 and/or map logic 310. The executable content or instructions may be used to implement or activate features, elements or logic of map manager 112. As described more below, memory 330 may also be arranged to at least temporarily maintain information associated with exchanging various messages with I/O devices or communication ports for network devices coupled to a switch via physical communication links. Memory 330 may also be arranged to at least temporarily maintain information associated with allocating unique identifiers and generating an interconnection map that includes at least some of the allocated unique identifiers as well as information exchanged with the I/O devices or communication ports.

Memory 330 may include a wide variety of non-volatile memory media including, but not limited to, one or more types of flash memory, programmable variables or states, read-only memory (ROM), random access memory (RAM), or other static or dynamic storage media.

In some examples, I/O interfaces 340 may provide an interface via a local communication medium or link between map manager 112 and elements of switch 110. I/O interfaces 340 may include interfaces that operate according to various communication protocols or standards to communicate over the local communication medium or link. These communication protocols or standards may be described in one or more industry standards (including progenies and variants) such as those associated with the Inter-Integrated Circuit ($I^2C$) specification, the System Management Bus (SMBus) specification, the Peripheral Component Interconnect Express (PCI Express) specification, the Universal Serial Bus (USB), specification or the Intelligent Platform Management Interface (IPMI) specification, version 2.0, revision 1.0, published in February 2004 (hereinafter "the IPMI specification"). This disclosure is not limited to only the above-mentioned standards and associated protocols.

According to some examples, I/O interfaces 340 may provide an interface via a network or system management communication medium or link between map manager 112 and elements outside of switch 110 (e.g., connect manager 132s). I/O interfaces 340 may include interfaces that operate according to various communication protocols or standards to communicate over the network or system management communication medium or link. These communication protocols or standards may be described in standards or specifications (including progenies and variants) such as the Ethernet standard, the PCI Express specification, the USB specification or the IPMI specification. This disclosure is not limited to only the above-mentioned standards and associated protocols.

Figure 4:
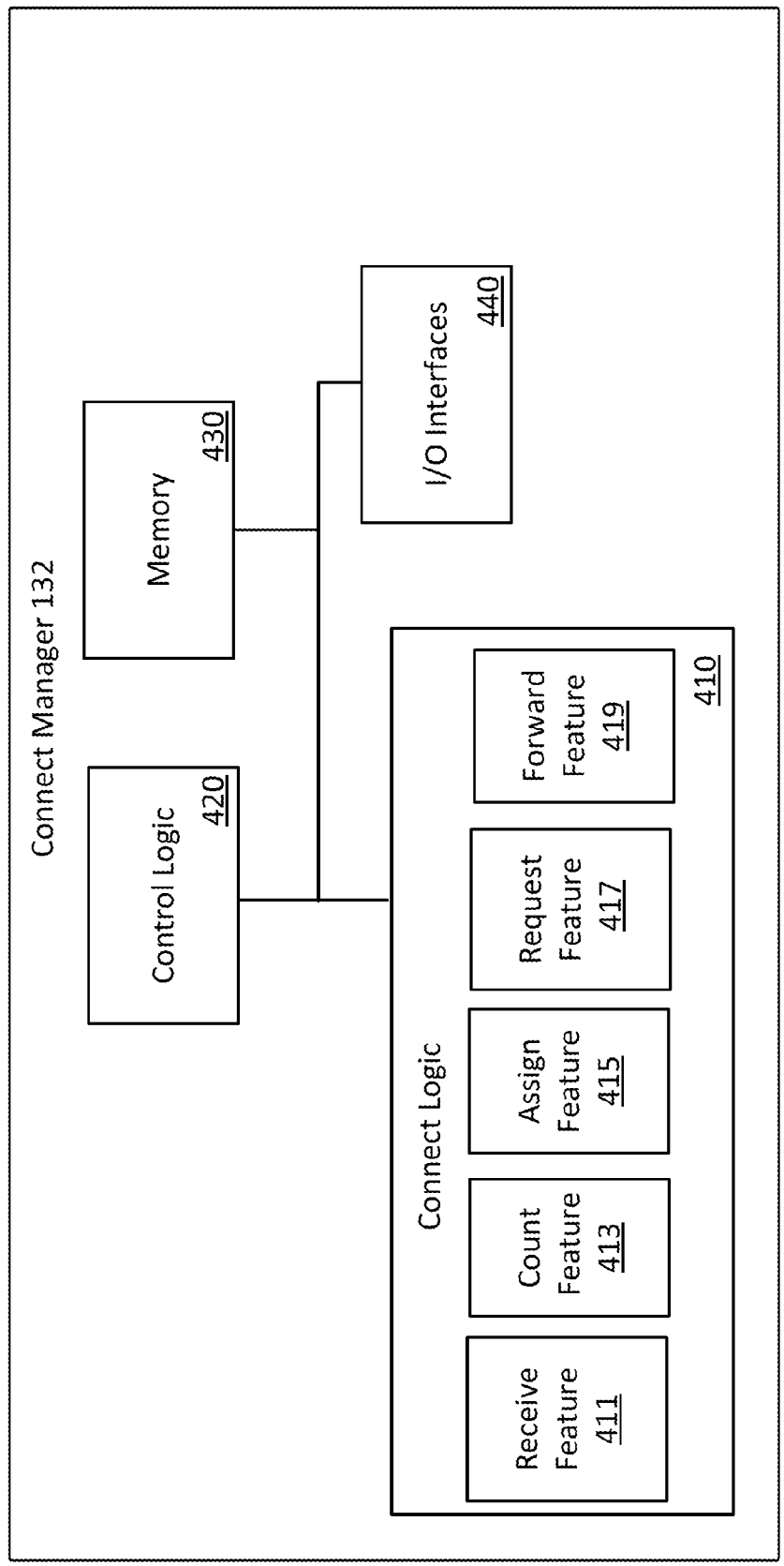
FIG. 4 illustrates a block diagram of an example architecture for a connect manager.

FIG. 4 illustrates a block diagram of an example architecture for connect manager 132. In some examples, connect manager 132 includes features and/or logic configured or arranged for exchanging messages with a map manager 112 at a switch in order to automate discovery of network device communication ports. A given connect manager 132 at an I/O device may also include logic and/or features to interact with other connect manager 132s at other I/O devices on a network device in order to forward information received from map manager 112. According to some examples, as shown in FIG. 4, connect manager 132 includes a connect logic 410, a control logic 420, a memory 430 and input/output (I/O) interfaces 440. As illustrated in FIG. 4, connect logic 410 may be coupled to control logic 420, memory 430 and I/O interfaces 440. Connect logic 410 may include one or more of a receive feature 411, a count feature 413, an assign feature 415, a request feature 417 or a forward feature 419, or any reasonable combination thereof.

In some examples, the elements portrayed in FIG. 4 are configured to support or enable connect manager 132 as described in this disclosure. A given connect manager 132 may include some, all or more elements than those depicted in FIG. 4. For example, connect logic 410 and control logic 420 may separately or collectively represent a wide variety of logic device(s) or executable content to implement the features of connect manager 132. Example logic devices may include one or more of a microprocessor, a microcontroller, a processor circuit, an FPGA, ASIC, a sequestered thread or a core of a multi-core/multi-threaded microprocessor, or any combination thereof.

In some examples, as shown in FIG. 4, connect logic 410 includes receive feature 411, count feature 413, assign feature 415, request feature 417 or forward feature 419. Connect logic 410 may be configured to use one or more of these features to perform operations while connect manager 132 is located at or with an I/O device 130. For example, receive feature 412 may receive request messages sent by map manager 112 at switch 110. Count feature 413 may gather and/or determine counts for numbers of communication ports supported by I/O devices at a given network device. Assign feature 415 may assign device numbers to I/O devices at the given network device. Assign feature 415 may also assign portions of unique identifiers received from map manager 112. Request feature 417 may generate network device request messages that include assigned device numbers, assigned portions of unique identifiers and indicates to I/O devices at a given network device to forward interconnect response messages from communication ports coupled to switch 110. Forward feature 417 may cause the interconnect response messages to be forwarded from communication ports coupled to switch 110.

In some examples, control logic 420 may be configured to control the overall operation of connect manager 132. As mentioned above, control logic 420 may represent any of a wide variety of logic device(s) or executable content. For some examples, control logic 420 may be configured to operate in conjunction with executable content or instructions to implement the control of connect manager 132. In some alternate examples, the features and functionality of control logic 420 may be implemented within connect logic 410.

According to some examples, memory 430 may be arranged to store executable content or instructions for use by control logic 420 and/or connect logic 410. The executable content or instructions may be used to implement or activate features, elements or logic of connect manager 132. Memory 430 may also be arranged to at least temporarily maintain information associated with exchanging messages with map manager 112 located at switch 110. Memory 430 may also be arranged to at least temporarily maintain information gathered to respond to request messages received from map manager 112 and/or other connect manager 132s located at or with another I/O device 130.

Memory 430 may include a wide variety of non-volatile memory media including, but not limited to, one or more types of flash memory, programmable variables or states, ROM, RAM, or other static or dynamic storage media.

In some examples, I/O interfaces 440 may provide an interface via a local communication medium or link between connect manager 132 and elements of an I/O device 130 or elements of a network device to include another connect manager 132 located with or at another I/O device 130. I/O interfaces 440 may include interfaces that operate according to various communication protocols or standards to communicate over the local communication medium or link. These communication protocols or standards may be described in one or more industry standards (including progenies and variants) such as those associated with the SMBus specification, the PCI Express specification, the USB, specification or the IPMI specification. This disclosure is not limited to only the above-mentioned standards and associated protocols.

According to some examples, I/O interfaces 440 may provide an interface via a network or system management communication medium or link between connect manager 132 and elements outside of a given network device (e.g., map manager 112). I/O interfaces 440 may include interfaces that operate according to various communication protocols or standards to communicate over the network or system management communication medium or link. These communication protocols or standards may be described in standards or specifications (including progenies and variants) such as the Ethernet standard, the PCI Express specification, the USB specification or the IPMI specification. This disclosure is not limited to only the above-mentioned standards and associated protocols.

Figure 5:
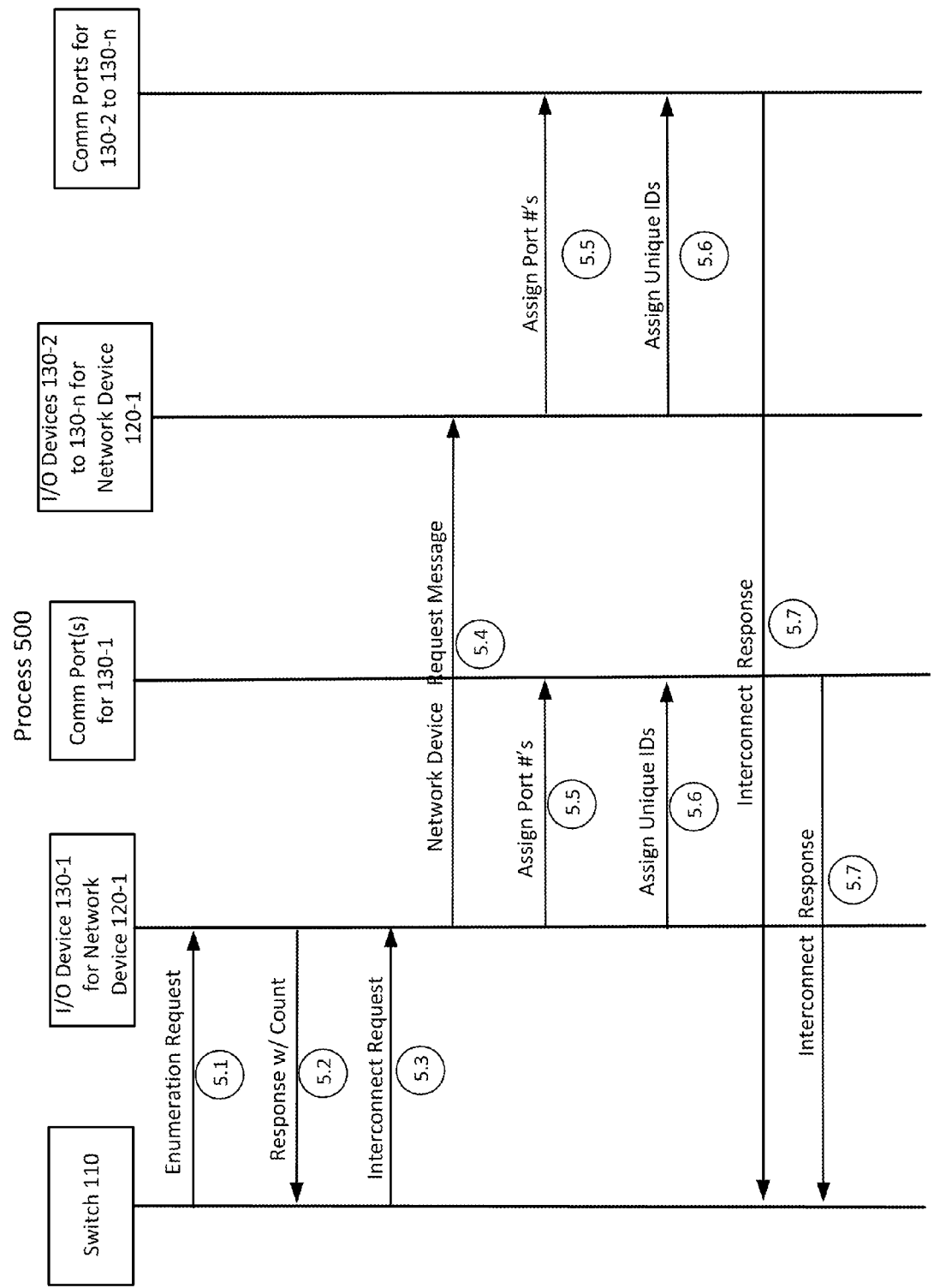
FIG. 5 illustrates an example process for exchanging messages to automate discovery of network device communication ports coupled to switch communication ports.

FIG. 5 illustrates an example process 500 for exchanging messages to automate discovery of network device communication ports coupled to switch communication ports. In some examples, elements of system 100 as shown in FIGS. 1-4 may be used to illustrate example operations related to process 500 shown in FIG. 5. The described example operations are not limited to implementations on system 100, or to map manager 112 or connect manager 132 as described above for FIGS. 1-4.

Beginning at process 5.1 (Enumeration Request), map manager 112 located at or with switch 110 may include logic and/or features configured to send an enumeration request message to at least one I/O device 130 located at or with network devices 120-1 to 120-n (e.g., via request feature 312). According to some examples, as shown in FIG. 5, the enumeration request message is sent to I/O device 130-1 at network device 120-1. For these examples, the enumeration request may be sent upon switch 110 detecting or discovering the coupling of communication port 114-1 to communication port 130-1 at I/O device 130-1 via physical communication link 140-1 (see FIG. 1). The enumeration request message may include a request for a count of communication ports supported by I/O devices located at or with network device 120-1.

Proceeding to process 5.2 (Response w/Count), connect manager 132 located at or with I/O device 130-1 at network device 120-1 may include logic and/or features configured to receive the enumeration request from map manager 112 at switch 110 (e.g., via receive feature 411). In some examples, responsive to receipt of the enumeration request, connect manager 132 may also include logic and/or features to obtain or gather information to determine the number of communication ports supported by I/O devices 130-1 to 130-$m$ at network device 120-1 (e.g., via count feature 413) For these examples, connect manager 132 may already have that information (e.g., stored in memory 430) or may request the information from a management controller for network device 120-1 (not shown). In an example where connect manager 132 already has the communication port count, that information may have been exchanged when network device 120-1 was initially powered up and each I/O device from among I/O devices 130-1 to 130-$m$ were configured for operation. Once the number of communication ports supported has been determined, connect manager 132 may send an enumeration response message to map manager 112 at switch 110.

Proceeding to process 5.3 (Interconnect Request), map manager 112 may include logic and/or features configured to receive the count information from connect manager 132 at I/O device 130-1 (e.g., via receive feature 312). Map manager 112 may also include logic and/or features to allocate unique identifiers (e.g., via allocate feature 316) such that each communication port included in the received count can have its own unique identifier. Thus, the unique identifiers are allocated to the communication ports of network device 120-1 based on the received count. Map manager 112 may further include logic and/or features to send an interconnect request message to connect manager 132 at I/O device 130-1 (e.g., via request feature 312). In some examples, the interconnect request message may include the allocated unique identifiers and also include a request for forwarding an interconnect response message from each communication port coupled to communication ports 114-1 to 114-9 via physical communication links 140-1 to 140-9.

Proceeding to process 5.4 (Computer Platform Request Message), the connect manager 132 located at I/O device 130-1 may include logic and/or features configured to receive the interconnect request message from map manager 112 (e.g., via receive feature 411). Connect manager 132 may also include logic and/or features configured to assign I/O device numbers to I/O devices 130-1 to 130-$m$ on network device 120-1. In some examples, connect manager 132 may assign I/O device 130-1 as device #1, I/O device 130-2 as device #2 and so on until all of the I/O devices 130-1 to 130-$m$ at network device 120-1 are assigned a device number. Connect manager 132 may also assign portions of the allocated unique identifiers received from map manager 112 in the interconnect request message to I/O devices 130-1 to 130-$m$ on network device 120-1. The portions, for example, may be based on the number of communication portions 134-1 to 134-$o$ that each I/O device supports. For example, if I/O device 130-1 supports communication ports 134-1 to 134-3 then I/O device 130-1 will be assigned a portion corresponding to three unique identifiers.

According to some examples, connect manager 132 at I/O device 130-1 may further include logic and/or features to generate and send a computer platform request message to the other I/O devices 130-2 to 130-$m$ (e.g., via request feature 417). In some examples, the computer platform request message sent to a respective I/O device from among I/O devices 130-1 to 130-$m$ includes the assigned device number and the assigned portions of allocated unique identifiers.

Proceeding to process 5.5 (Assign Port #s), connect manager 132 located at I/O device 130-1 as well as other connect manager 132s located at I/O devices 130-2 to 130-$m$ may include logic and/or features configured to assign port numbers to each communication port supported by a respective I/O device (e.g., via assign feature 415). In some examples, connect manager 132 at I/O device 130-2 may assign communication port 134-1 as port #1, communication port 134-2 as port #2 and so on until all of the communication ports 134-1 to 134-$o$ at I/O device 130-2 are assigned a port #.

Proceeding to process 5.6 (Assign Unique Identifiers), connect managers 132 located at I/O devices 130-1 to 130-2 may also include logic and/or features configured to distribute or assign unique identifiers included in the assigned portions of allocated unique identifiers received from map manager 112 (e.g., via assign feature 415). In some examples, each communication port supported by a respective I/O device from among I/O devices 130-1 to 130-$m$ should have both an assigned port # and an assigned unique identifier that originated from map manager 112.

Proceeding to process 5.7 (Interconnect Response), connect manager 132s located at I/O device 130-1 to 130-$m$ may include logic and/or features configured to cause an interconnect response message to be forwarded (e.g., via forward feature 419). In some examples, the interconnect response message is to be forwarded from each communication port supported by a respective I/O device that is separately coupled to a communication port from among communication ports 114-1 to 114-9 via a physical communication link from among physical communication links 140-1 to 140-9. For example, connect manager 132 at I/O device 130-1 may cause an interconnect response message to be forwarded from a communication port assigned as port #1 that couples to communication port 114-1 via physical communication link 140-1. The forwarded interconnect response message may include information to indicate the assigned device number for I/O device 130-1, the assigned port # for communication port 114-1 and a unique identifier that was assigned as mentioned above. According to some examples, map manager 112 may receive interconnect response messages from each of the communication ports of network device 120-1 that coupled to communication ports 114-1 to 114-9. Map manager 112 may then generate an interconnection map based on the received interconnect response messages.

Although not shown in FIG. 5, in some examples, a second enumeration request message may be sent to an I/O device from among I/O devices 130-1 to 130-$m$ located at one of the other network devices of system 100. For these examples, the same exchanging of messages as described above for process 500 may occur between map manager 112 at switch 110, a connect manager 132 located at the I/O device or between connect manager 132s located at I/O devices 130 maintained on the same computing device. Additional enumeration request messages and subsequent exchanges may occur until all of the network device communication ports coupled to switch 110's communication ports 140-1 to 140-9 have been discovered and included in the interconnection map.

FIG. 6 illustrates an example allocation table 600. In some examples, map manager 112 may include logic and/or features to generate allocation table 600 (e.g., via allocate feature 316) based on count information received from I/O devices at network devices 120-1 to 120-2 (e.g., included in enumeration response messages). In some examples, as shown in FIG. 6, allocation table 600 includes allocated unique identifiers 120-1A-I for network device 120-1, 120-2A-I for network device 120-2 and 120-nA-I for network device 120-$n$.

FIG. 7 illustrates an example interconnect response message format 700. In some examples, interconnect response messages forwarded from network device communication ports coupled to switch communication ports may be in the format of interconnect response message format 700. As shown in FIG. 7, interconnect response message format 700 includes a unique identifier field 710, an I/O device # field 720 and a port # field 730. According to some examples, a connect manager 132 located at a given I/O device may populate unique identifier field 710 with a unique identifier assigned to a communication port. The connect manager 132 may populate I/O device # field 720 with the I/O device number assigned to the given I/O device. The connect manager 132 may also populate port # field 730 with the port # assigned to the communication port by the given I/O device.

FIG. 8 illustrates an example interconnection map 800. In some examples, as shown in FIG. 8, interconnection map 800 may include information to indicate how communication ports 114-1 to 114-9 of switch 110 are coupled with the communication ports of network devices 120-1 to 120-n. For these examples, the unique identifiers included in allocation table 600 are matched up with assigned I/O device and port #'s that couple to given communication ports of switch 110. The information to generate interconnect map 800, for example, may have been obtained from interconnect response messages forwarded from the given communication ports.

According to some examples, interconnection map 800 may be used to configure system 100 for various operations to include failover operations, aggregation operations or Quality of Service (QoS) operations. For these examples, map manager 112 may forward interconnection map 800 to other logic and/or features of switch 110 configured to manage the various operations. Map manager 112 may also be configured to provide interconnect map 800 as a paper printout so that a technician for system 100 can maintain a physical record of how switch 110 is coupled to network devices 120-1 to 120-n.

Figure 9:
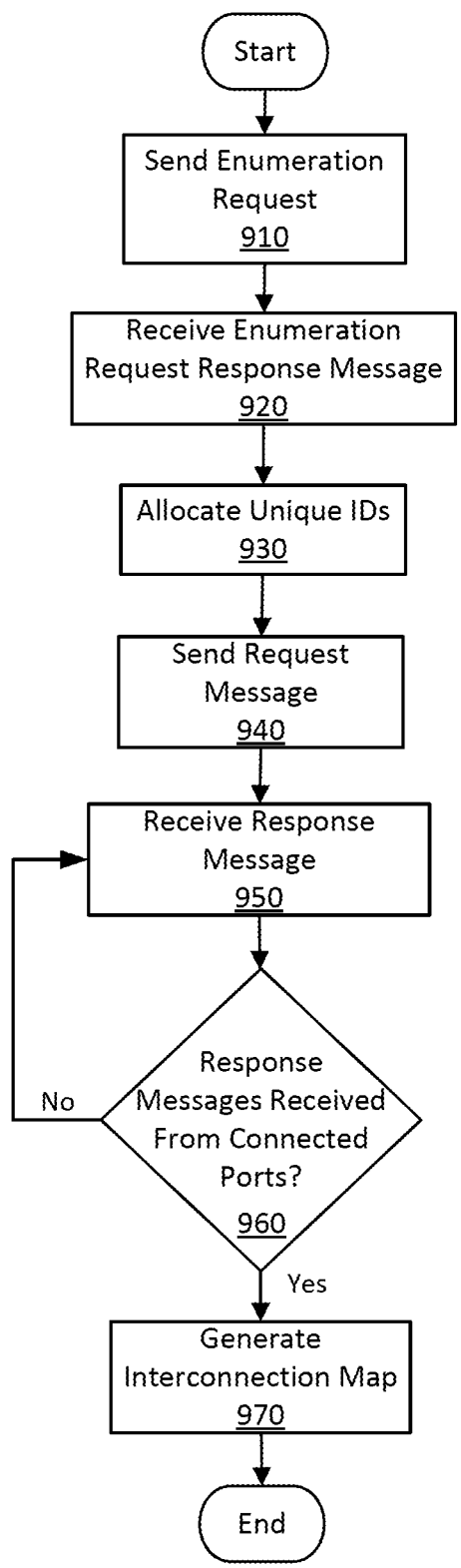
FIG. 9 illustrates an example flow diagram for automated discovery of communication ports coupled to a switch.

FIG. 9 illustrates an example flow diagram for automated discovery of communication ports coupled to a switch. In some examples, elements of system 100 as shown in FIG. 1 or 2 may be used to illustrate example operations related to the flow chart depicted in FIG. 9. Map manager 112 as shown in FIG. 1 or 3 or connect manager 132 as shown in FIG. 1 or 4 may also be used to illustrate the example operations. Process 500, allocation table 600, interconnect response message format 700 or interconnection map 800 shown in FIGS. 5-8 may also be used to illustrate the example operations The described example operations are not limited to implementations on system 100 or to map manager 112 or to connect manager 132 as described above for FIGS. 1-4. The example operations are also not limited to process 500, allocation table 600, interconnect response message format 700 or interconnection map 800 shown in FIGS. 5-8.

Moving from the start to block 910 (Send Enumeration Request), map manager 112 at switch 110 may include logic and/or features configured to send an enumeration request (e.g., via (request feature 312) to connect manager 132s at I/O devices located at network devices 120-1 to 120-n. In some examples, the enumeration request includes a request for a count of communication ports supported by I/O devices maintained at these network devices.

Proceeding from block 910 to block 920 (Receive Enumeration Request Response Message), map manager 112 may include logic and/or features configured to receive enumeration request response messages from network devices 120-1 to 120-n (e.g., via receive feature 314). In some examples, the enumeration request response messages include separate counts from each network device of the number of communication ports supported by I/O devices.

Proceeding from block 920 to block 930 (Allocate Unique IDs), map manager 112 may include logic and/or features configured to allocate unique identifiers based on the counts received from network devices 120-1 to 120-n. In some examples, allocation table 800 may be generated by map manager 112 to track the allocation of unique identifiers.

Proceeding from block 930 to block 940 (Send Request Message), map manager 112 may include logic and/or features configured to send a request message such as an interconnect request message to at least one I/O device maintained at each of network devices 120-1 to 120-n (e.g., via request feature 312). In some examples, the interconnect request message includes a request for forwarding separate interconnect response messages from each network device communication port coupled to a given switch 110 communication port from among communication ports 114-1 to 114-9. For these examples, the interconnect request message also includes the allocated unique identifiers that are applicable to communication ports for a given network device. For example, as shown in allocation table 600, unique identifiers 120-1A-I may be included in the interconnect request message sent to an I/O device maintained at network device 120-1.

Proceeding from block 940 to block 950 (Receive Response Message), map manager 112 may include logic and/or features configured to receive response message(s) such as interconnect response messages forwarded from network device communication ports (e.g., via receive feature 314). In some examples, at least a portion of the interconnect response messages may be in the format of interconnect response message format 700 and each interconnect response message may include a unique identifier from among the allocated unique identifiers as indicated in allocation table 600. The interconnect response messages may also each include information associated with an I/O device supporting the communication port via which the respective interconnect response message was forwarded.

Proceeding from block 950 to decision block 960 (Response Messages Received from Connected Ports?), map manager 112 may include logic and/or features configured to determine if all of the interconnect response messages have been received (e.g., via receive feature 314) from communication ports connected to switch 110. In some examples, the determination may be based on map manager 112 waiting a given period of time for receiving the interconnect response messages. Once the given period of time has been expired, map manager 112 may determine that all the interconnect response messages have been received. If all the interconnect response messages have been, the process moves to block 970. Otherwise, the process moves back to block 950.

Moving from decision block 960 to block 970 (Generate Interconnection Map), map manager 112 may include logic and/or features to generate an interconnection map based on received interconnect response messages (e.g., via generate feature 318). In some examples, an interconnection map similar to interconnection map 800 may be generated. The interconnection map may be used to determine how communication ports 114-1 to 114-9 may be coupled with communication ports of network devices 120-1 to 120-n. The process then comes to an end.

According to some examples, the process may start over again if map manager 112 or other logic and/or features of switch 110 detect that either a network device and/or I/O device was added or removed from system 100.

Figure 10:
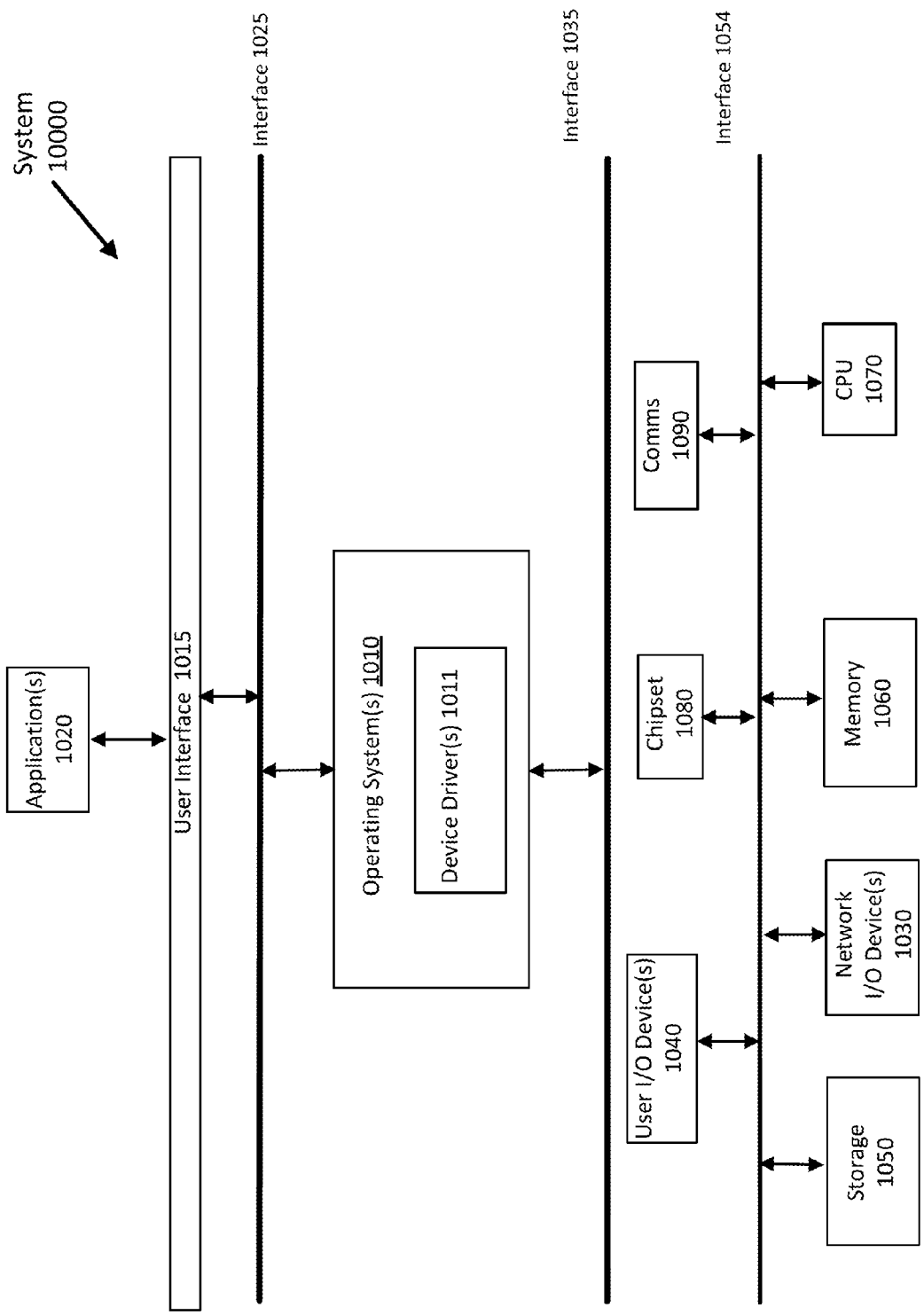
FIG. 10 illustrates an example system diagram for a network device or a switch.

FIG. 10 illustrates an example system 1000. In some examples, elements of system 1000 may be incorporated in either switch 110 and/or network devices 120-1 to 120-n as shown in FIGS. 1-2. As shown in FIG. 10, system 1000 includes, operating system(s) 1010, application(s) 1020, network input/output (I/O) device(s) 1030, user input/output (I/O) device(s) 1040, a storage 1050, a memory 1060, a central processing unit (CPU) 1070, a chipset 1080, and communications (Comms) 1090. According to some examples, several interfaces are also depicted in FIG. 10 for interconnecting and/or communicatively coupling elements of system 1000. For example, user interface 1015 and interface 1025 may allow for users (not shown) and/or application(s) 1020 to couple to operating system(s) 1010. Also, interface 1035 may allow for elements of operating system(s) 1010 (e.g., device driver(s) 1011) to communicatively couple to elements of system 1000 such as network I/O device(s) 1030, user I/O device(s) 1040, storage 1050, memory 1060, CPU 1070, chipset 1080 or comms 1090. Interface 1054, for example, may allow hardware and/or firmware elements of system 1000 to communicatively couple together, e.g., via a system bus or other type of internal communication channel.

In some examples, as shown in FIG. 10, system 100 may include operating system(s) 1010. Operating system(s) 1010, for example, may include one or more operating systems. According to some examples, separate operating systems included in operating systems(s) 1010 may be implemented as part of separate virtual machines supported by elements of system 1000. For these examples, the separate virtual machines may be associated with one or more processors included in CPU 1070.

According to some examples, as shown in FIG. 10, operating system(s) 1010 may separately include device driver(s) 1011. Device driver(s) 1011 may include logic and/or features configured to interact with hardware/firmware type elements of system 1000 (e.g., via interface 1035). For example, device driver(s) 1011 may include device drivers to control or direct storage 1050 or memory 1060 to fulfill requests made by application(s) 1020 or operating system(s) 1010. Device driver(s) 1011 may also include device drivers to allow network I/O device(s) 1030 to interact with CPU 1070 and memory 1060 to receive/forward data via communication channels coupled to system 1000 (e.g., via network I/O device(s) 1030 or comm 1090).

In some examples, application(s) 1020 may include applications that may be implemented on system 1000. For these examples, applications(s) 1020 may request access (e.g., through operating system(s) 1010) or use of elements of system such as network I/O device(s) 1030, user I/O device(s) 1040, storage 1050 or memory 1060.

According to some examples, network I/O device(s) 1030 may be similar to network I/O devices 130 shown and described above for FIG. 1. For these examples, network I/O device(s) 1030 may include a connect manager 132 (not shown in FIG. 10) having logic and/or features configured or arranged for exchanging messages with elements of a switch (e.g, a map manager) in order to automate discovery of communication ports (e.g., included in comms 1090) for system 1000 that may be coupled to the switch via one or more communication links.

In some examples, if system 1000 is incorporated in a switch such as switch 110 shown and described above for FIG. 1, network I/O device(s) 1030 may include a map manager (not shown in FIG. 10). The map manager may have logic and/or features configured or arranged for exchanging messages with elements of network devices coupled to the switch via one or more communication links. The messages may be exchanged in order to automate discovery of communication ports at the network devices.

In some examples, user I/O device(s) 1040 may include one or more user input devices coupled to interface 1054 for entering data and commands to be implemented by elements of system 1000. For example, the user input devices may include a keyboard, mouse, touch screen, track pad, track ball, isopoint, a voice recognition system, and/or the like. Similarly, user I/O device(s) 1040 may include one or more user output devices coupled to interface 1054 for outputting information to an operator or user. For example, the user output devices may include one or more displays, printers, speakers, and/or other output devices, if desired. For example, one of the user output devices may be a display. The display may be a cathode ray tube (CRTs), liquid crystal displays (LCDs), or any other type of display.

In some examples, storage 1050 may include various types of memory configured to be implemented or operated in a storage mode of operation. Storage 1050 may include at least one or a combination of different types of storage devices to store relatively large amounts of data. These different types of storage devices may include, but are not limited to, one or more of a magnetic disk drive, an optical disk drive, a tape drive, an internal storage device, an attached storage device, flash memory, battery backed-up SDRAM (synchronous DRAM), a network accessible storage device, and/or other types of non-volatile memory (e.g., phase change material (PCM)). Although not shown in FIG. 10, in some examples, storage 1050 may be a user I/O device included among user I/O device(s) 140.

According to some examples, memory 1060 may include at least one or a combination of different types of memory to include RAM, DRAM, static RAM (SRAM), phase change material RAM (PRAM), and/or other types of volatile memory.

According to some examples, CPU 1070 may be implemented as a central processing unit for system 1000. CPU 1070 may include one or more processors separately having one or more processor cores. Also, the processors included in CPU 1070 may be any type of processor, such as, for example, a multi-core processor, a reduced instruction set computer (RISC), a processor having a pipeline, a complex instruction set computer (CISC), digital signal processor (DSP), and so forth.

In some examples, chipset 1080 may provide intercommunication among operating system(s) 1010, network user device(s) 1030, user I/O device(s) 1040, storage 1050, memory 1060, CPU 1070 or comms 1090. For example, chipset 1080 may provide intercommunication between operating system(s) 1010, network I/O device(s) 1030, user I/O device(s) 1040, storage 1050 and CPU 1070 to retrieve information from storage 1050 to display graphics on a display included in user I/O device(s) 1040. The graphics may have been rendered by CPU 1070 at the request of an operating system included in operating system(s) 1010.

In some examples, comms 1090 may include logic and/or features to enable system 1000 to communicate externally with elements remote to system 1000. These logic and/or features may include communicating over wired, wireless or optical communication channels or connections via one or more wired, wireless or optical networks. In communicating across such networks, comms 1090 may operate in accordance with one or more applicable communication or networking standards in any version. Also, in some examples, comms 1090 may be integrated with network I/O device(s) 1030 in order to receive/forward data associated with communications to elements remote to system 1000.

As mentioned above, interface 1054, may allow hardware and/or firmware elements of system 1000 to communicatively couple together. According to some examples, interface 1054 may operate in accordance with one or more protocols or standards. These protocols or standards may be described in one or one or more industry standards (including progenies and variants) such as those associated with the I$^2$C specification, SMBus specification, the PCI Express specification, the USB, specification, the IPMI specification, the Accelerated Graphics Port (AGP) specification, the High-Definition Multimedia Interface (HDMI) standard, the Digital Visual Interface (DVI) specification, the Bluetooth™ specification, or the Serial Advanced Technology Attachment (SATA) specification. Although this disclosure is not limited to only the above-mentioned standards and associated protocols.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method comprising:
sending an enumeration request message from a switch capable of being coupled to one or more network devices via physical communication links to a first input/output device for a first network device from among the one or more network devices, the enumeration request message including a request for a count of communication ports supported by input/output devices maintained at the first network device;

receiving an enumeration response message from the first input/output device that includes the count;

allocating unique identifiers based on the count included in the enumeration response message;

sending a request message to the first input/output device, the request message to include the allocated unique identifiers and also includes a request for forwarding a response message from each communication port capable of being coupled to the switch via separate physical communication links;

receiving response messages forwarded from one or more communication ports capable of being coupled to the switch via the separate physical communication links, each response message to include a unique identifier from among the allocated unique identifiers and information associated with an input/output device supporting the communication port via which the respective response message was forwarded; and generating an interconnection map based on the received response messages.

2. The method of claim 1, the information associated with the input/output device supporting the communication port via which the respective response message was forwarded comprising a device number assigned to the input/output device and a port number assigned to the communication port by the supporting input/output device.

3. The method of claim 2, comprising the device number assigned by the first input/output device.

4. The method of claim 1, comprising:

determining which given communication port supported by the first input/output device at the first network device couples with a given switch communication port via a physical communication link from among the separate physical communication links using the interconnection map.

5. The method of claim 1, comprising:

sending a second enumeration request message to a second input/output device for a second network device from among the one or more network devices, the second enumeration request message including a request for a count of communication ports supported by input/output devices maintained at the second network device;

receiving an enumeration response message from the second input/output device that includes the count;

allocating additional unique identifiers, the additional allocated unique identifiers based on the count received from the second input/output device;

sending a second request message to the second input/output device that includes the additional allocated unique identifiers and also includes a second request for forwarding a response message from each second network device communication port capable of being coupled to the switch via separate physical communication links;

receiving response messages forwarded from each second network device communication port capable of being coupled to the switch via the separate physical communication links, each response message to include a unique identifier from among the additional allocated unique identifiers and information associated with an input/output device supporting the communication port via which the respective response message was forwarded; and updating the interconnection map based on the response messages received from the second network device communication ports.

6. The method of claim 1, the switch and the one or more network devices included in a single housing.

7. The method of claim 1, the separate physical communication links arranged to operate in accordance with an Ethernet standard and including one of a Category 5e cable, an optical fiber cable or a patch cable.

8. The method of claim 1, wherein the first input/output device or the input/output device supporting the communication port are arranged to operate as a network interface card for the first network device.

9. The method of claim 1, comprising:

configuring the switch and the one or more network devices for one of failover operations, aggregation operations or Quality of Service (QoS) operations using the interconnection map.

10. An apparatus comprising:

a processor circuit maintained at an input/output device for a network device, the input/output device capable of being coupled to one or more switches via one or more physical communication links; and a memory unit communicatively coupled to the processor circuit, the memory unit arranged to store instructions for logic operative on the processor circuit, the logic configured to receive an enumeration request message from a first switch from among the one or more switches, the enumeration request message including a request for the input/output device to provide a count of communication ports supported by one or more input/output devices maintained at the network device, responsive to the enumeration request message, the logic configured to cause an enumeration response message to be forwarded to the first switch, the enumeration response message to include the count, the logic also configured to receive a request message from the first switch that includes allocated unique identifiers based on the count, the request message to also include a request for forwarding response messages from communication ports capable of being coupled to the first switch via separate physical communication links, the response messages to include separate unique identifiers from among the allocated unique identifiers and information associated with input/output devices supporting the communication ports via which the respective response messages were forwarded, responsive to receipt of the request message, the logic also configured to cause the response messages to be forwarded from the communication ports capable of being coupled to the first switch via the separate physical communication links.

11. The apparatus of claim 10, comprising the memory unit to include volatile memory.

12. The apparatus of claim 10, the logic configured to cause the response message to be forwarded comprising the logic to assign a device number for a first input/output devices maintained at the network device and assign a first portion of the allocated unique identifiers to the first input/output device to enable different unique identifiers to be associated with each communication port supported by the first input/output device, the logic also configured to include the first device number and the first portion of the allocated unique identifiers in a network device request message that is forwarded to the first input/output device, responsive to receipt of the network device request message, the first input/output device is to cause an response message to be forwarded to the first switch via a first communication port capable of being coupled to the first switch and supported by the first input/output device, the response message to indicate a unique identifier associated with the first communication port, the first device number, and a port number assigned to the first communication port by the first input/output device.

13. The apparatus of claim 10, comprising the first switch to receive the response messages and generate an interconnection map based on the received response messages, the interconnection map to be used to determine which given communication ports supported by the one or more input/output devices at the network device couple with given first switch communication ports via the separate physical communication links.

14. The apparatus of claim 10, the network device and the first switch included in a single housing configured to have the first switch located at a first shelf in the single housing and the network device located at a second shelf in the single housing.

15. The apparatus of claim 10, the one or more physical communication links arranged to operate in accordance with an Ethernet standard and including one of a Category 5e cable, an optical fiber cable or a patch cable.

16. The apparatus of claim 10, wherein the input/output devices supporting the communication ports capable of being coupled to the first switch are arranged to operate as network interface cards for the network device.

17. At least one non-transitory machine readable medium comprising a plurality of instructions that in response to being executed on a system cause the system to:
receive an enumeration request message at an first input/out device for a network device that is capable of being coupled to one or more switches via one or more physical communication links, the enumeration request message received from a first switch from among the one or more switches, the enumeration request message including a request for the system to provide a count of communication ports supported by one or more input/output devices maintained at the network device;
responsive to receipt of the enumeration request, cause an enumeration response message to be forwarded to the first switch, the enumeration response message to include the count;
receive a request message that includes allocated unique identifiers based on the count, the request message to also include a request for forwarding response messages from communication ports capable of being coupled to the first switch via separate physical communication links, the response messages to include separate unique identifiers from among the allocated unique identifiers and information associated with input/output devices supporting the communication ports via which the respective response messages were forwarded; and
responsive to receipt of the request message, cause the response messages to be forwarded from the communication ports capable of being coupled to the first switch via the separate physical communication links.

18. The at least one non-transitory machine readable medium of claim 17, comprising the first switch to receive the response messages and generate an interconnection map based on the received response messages, the interconnection map to be used to determine which given communication ports supported by the one or more input/output devices at the network device couple with given first switch ports via the separate physical communication links.

19. The at least one non-transitory machine readable medium of claim 17, the network device and the switch included in a single housing arranged to have the first switch located at a first shelf in the single housing and the network device capable of being located at a second shelf in the single housing.

20. The at least one non-transitory machine readable medium of claim 17, comprising the one or more physical communication links arranged to operate in accordance with an Ethernet standard and including one of a Category 5e cable, an optical fiber cable or a patch cable.

21. The at least one non-transitory machine readable medium of claim 17, wherein the input/output devices supporting the communication ports capable of being coupled to the first switch are arranged to operate as network interface cards for the network device.

* * * * *

UNITED STATES PATENT AND TRADEMARK OFFICE
CERTIFICATE OF CORRECTION

PATENT NO. : 8,792,397 B2  
APPLICATION NO. : 13/426999  
DATED : July 29, 2014  
INVENTOR(S) : Patrick G. Kutch Page 1 of 1

It is certified that error appears in the above-identified patent and that said Letters Patent is hereby corrected as shown below:

On the title page, in the last line of the Abstract, delete "input/out" and insert -- input/output --, therefor.

In the Claims

In column 17, lines 28-29, in claim 17, delete "input/out" and insert -- input/output --, therefor.

Signed and Sealed this  
Fifth Day of May, 2015

Michelle K. Lee  
*Director of the United States Patent and Trademark Office*